Figure 1:
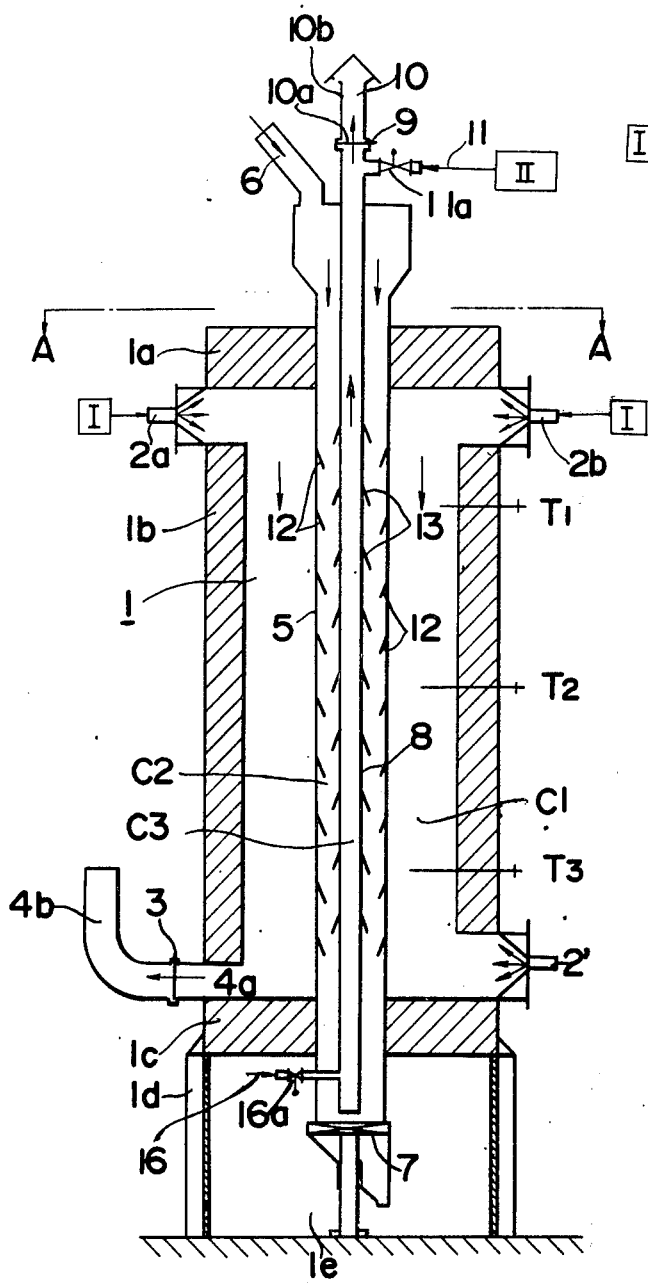

United States Patent [19]

Matsumoto et al.

[11] 4,007,014

[45] Feb. 8, 1977

[54] ACTIVATED CARBON REVIVIFICATION EQUIPMENT

[75] Inventors: Zenji Matsumoto, Osaka; Kiyoshi Adachi; Toyohisa Fujimoto, both of Shizuoka; Nobutaka Ninomiya, Kyoto, all of Japan

[73] Assignee: Takeda Chemical Industries, Ltd., Osaka, Japan

[22] Filed: Nov. 21, 1975

[21] Appl. No.: 634,442

Related U.S. Application Data

[63] Continuation of Ser. No. 432,312, Jan. 10, 1974, abandoned.

[30] Foreign Application Priority Data

Jan. 16, 1973   Japan ............................. 48-7484

[52] U.S. Cl. .................. 23/277 R; 34/171; 432/95; 252/418; 252/420; 252/445; 201/34; 201/38; 202/120; 202/121
[51] Int. Cl.² .................. B01J 8/12; B01J 21/18; C10B 47/20
[58] Field of Search .............. 23/277 R; 34/171; 432/95; 252/418, 420, 445; 201/34, 38; 202/120, 121

[56] References Cited

UNITED STATES PATENTS

| | | | |
|---|---|---|---|
| 308,475 | 11/1884 | Eastwick | 34/171 |
| 685,336 | 10/1901 | Leroy et al. | 34/171 UX |
| 2,600,425 | 6/1952 | Parry | 23/277 R |

FOREIGN PATENTS OR APPLICATIONS 242,659   9/1926   United Kingdom ............... 252/445

*Primary Examiner*—James H. Tayman, Jr.
*Attorney, Agent, or Firm*—Wenderoth, Lind & Ponack

[57] ABSTRACT

The apparatus comprises an outermost, an intermediate, and an innermost compartment, the outermost compartment being provided with burners, activated carbon being supplied into, treated in, and removed from the intermediate compartment, and there being communication for gas between the three compartments. In revivification by the direct heating process, reactor gas is supplied into the outermost compartment, heated by the burners, passed into the intermediate compartment to contact the activated carbon being treated, and is then passed into the innermost compartment and exhausted therefrom. In revivification by the indirect heating process, reactor gas is supplied into the innermost compartment, passed into the intermediate compartment for treatment of activated carbon, and then passed into the outermost compartment and is exhausted therefrom, the innermost and intermediate compartments and elements therein being indirectly heated by the burners of the outermost compartment.

4 Claims, 4 Drawing Figures

ACTIVATED CARBON REVIVIFICATION EQUIPMENT

This is a continuation of application Ser. No. 432,312, filed Jan. 10, 1974 (now abandoned).

The present invention relates to an apparatus for revivification of activated carbon, and more particularly to a revivification apparatus which permits revivification of activated carbon either by a direct heating process or by an indirect heating process.

Activated carbon is used on a large scale in a wide variety of industries, the main applications thereof being adsorption of gases or vapours and decolorizing or purification of liquids. At present no one type of activated carbon is known to be suitable for all these purposes. The properties of activated carbon revivified, and hence, the applications to which the carbon may be put, are dependent both on the properties of the raw material and on the method of activation used. Various types of equipment for effecting what is known as revivification are known, whereby, after saturation of the activated carbon with a vapour or adsorbed colour and the like, the vapour or coloration may be removed, and the carbon made ready for re-use. As with original activation, the properties of revivified activated carbon are dependent on the process employed, the principal processes being revivification by direct heating and revivification by indirect heating. Conventional direct and indirect heating processes require different sets of equipment, which presents disadvantages both in terms of work procedures and capital outlay. If it is necessary to proceed with both types of revivification processes, it is necessary to provide two different types of equipment in two different locations.

It is accordingly an object of the present invention to provide an apparatus which permits revivification of activated carbon either by the direct heating process or by the indirect heating process.

It is a further object of the present invention to provide an activated carbon revivification apparatus wherein improved mixing of saturated activated carbon with reactant materials is effected, both in the direct and in the indirect heating processes, whereby improved revivification results are obtained.

It is another object of the invention to provide an activated carbon revivification apparatus which is simple and economical in operation and construction.

In accomplishing these and other objects, there is provided, according to the present invention, an activated carbon revivification apparatus comprising a vertical retort, a vertical column located centrally in the retort, and a vertical pipe located centrally in the column. The retort is provided with a first reactor gas supply means, with burners, and with a first exhaust outlet fitted with a damper. At the top of the column there is a feed inlet for the activated carbon to be treated, and at the bottom thereof there is a product recovery means for reception and removal of revivified carbon. The bottom of the vertical pipe is sealed, and the top communicates both with a second reactor gas supply means and a second exhaust outlet fitted with a damper. Downwardly inclined baffles are provided on the inner wall of the column and on the outer wall of the pipe. The baffles of the column and of the pipe are staggered with respect to one another, and the column and pipe are further provided with ducts which permit passage of vapour or gas therethrough. Revivification by direct heating process is achieved by actuating the burners, closing the first exhaust outlet, opening the second exhaust outlet, and supplying reactor gas through the first gas supply means, while at the same time supplying activated carbon to be treated through the carbon supply means. The changeover to revivification of activated carbon by the indirect heating process is simply achieved by opening the first exhaust outlet, closing the second exhaust outlet, and supplying reactor gas through the second gas supply means.

Figure 2:
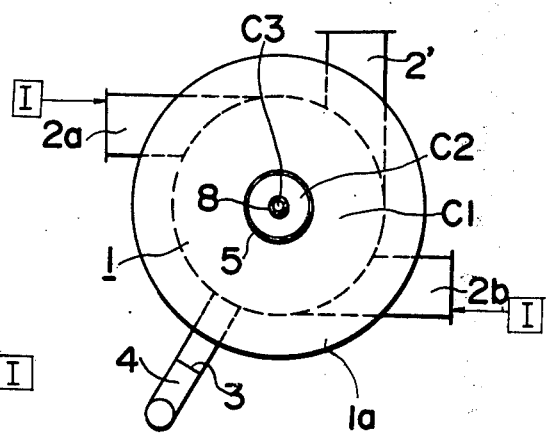
Figure 3:
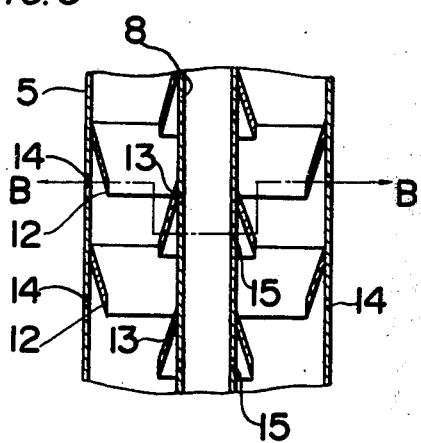
Figure 4:
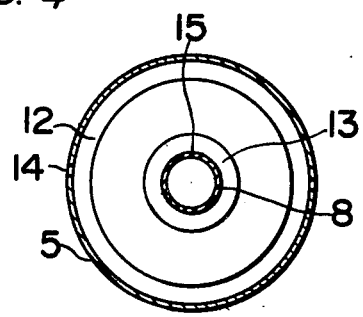

A better understanding of the present invention may be had from the following full description when read in conjunction with the attached drawings, in which;

FIG. 1 is a vertical cross-sectional view of an activated carbon revivification equipment according to one embodiment of the invention, FIG. 2 is a horizontal cross-sectional view taken through the line A—A of FIG. 1, FIG. 3 is a detail view showing the arrangement of the baffles and vapour ducts in the embodiment of FIG. 1, and FIG. 4 is a horizontal cross-sectional view taken through the line B—B of FIG. 3, Referring to FIGS. 1 and 2, the revivification equipment of the invention may be seen to comprise a vertical retort 1 forming a top wall 1a, side wall 1b, and bottom wall 1c, a hollow, vertical reactor column 5 located centrally in the retort 1, and a vertical pipe 8 located centrally within the column 5. The retort 1, column 5, and pipe 8 are approximately cylindrical in shape and aligned along the same vertical axis. The revivification equipment may be conveniently thought of as constituting three main compartments: an outermost compartment C1, which is generally defined by the outer side of the vertical column 5 and the inner sides of the top, side, and bottom walls 1a, 1b, 1c of the retort 1; an intermediate compartment C2, which is generally defined by the inner side of the column 5 and the outer side of the vertical pipe 8, and an innermost compartment C3, which is defined by the inner side of the pipe 8.

Referring now more particularly to FIG. 1, the retort 1 rests on a base 1d, which supports, or partially supports, the revivification equipment, and which forms a hollow portion 1e for accommodation of certain parts of the equipment described below. The retort walls 1a, 1b, 1c are comparatively thick and are made of suitable material to withstand and to ensure retention of heat. The retort 1 is provided with burners 2a, 2b, 2', which communicate with the outermost compartment C1, and which are inclined tangentially to the circle formed by the retort side wall 1b, as indicated also in FIG. 2. Due to this inclination of the burners 2a, 2b, 2', a rotatory effect is imparted on the heated air or other vapour directed into the retort 1 by the burners 2a, 2b, 2', whereby even heating of the interior of the retort 1 is ensured. Two burners 2a, 2b are provided near the top of the retort side wall 1b, below the top wall 1a. The entrances through which the two burners 2a, 2b communicate with the outermost compartment C1 are on opposite sides of the side wall 1a. The burner 2' is provided near the bottom of the retort side wall 1b, above the base wall 1c, and, with respect to the circle formed by the side wall 1a, the entrance through which the burner 2' communicates with the outermost compartment C1 is a quadrant removed from the entrances of the upper burners 2a, 2b.

The retort 1 is also provided with a connection to a first reactor gas supply system I. In this embodiment, the system of supply of air for either or both the burners 2a, 2b is dual-purpose, serving also as the first reactor gas supply system I, and effects forced feed of steam into the outermost compartment C1, wherein the steam is brought into contact with, and revivifies saturated activated carbon, as described in further detail below. It is not essential for the purposes of the invention that the air supply system to the burners 2a, 2b also function as the first reactor gas supply system I, but the first reactor gas supply system I may be provided with independent communication to the outermost compartment C1. At the lower end of the retort side wall 1b, on the opposite side thereof from the entrance of the lower burner 2', and generally on a level with the lower burner 2', there is an exhaust outlet 4a which communicates with an exhaust pipe 4b and is closeable by a damper 3 provided externally to the retort 1.

The hollow, vertical reactor column 5 is located in the retort 1, in a generally central position with respect thereto, and is longer than the retort 1. The top of the reactor column 5 extends through and above the retort top wall 1a, and the bottom of the reactor column extends through and below the retort bottom wall 1c into the hollow portion 1e of the base 1d. That portion of the reactor column 5 above the retort top wall 1a is somewhat greater in diameter than the rest of the column 5 and communicates with a downwardly inclined chute 6, or similar supply means, by which activated carbon, which has been saturated with vapour or colour, and which is to be revivified, may be supplied into the reactor column 5. At the bottom end of the reactor column 5 is a product recovery unit 7 which is accommodated in the base hollow portion 1e, receives treated carbon, and removes the carbon at a rate proportionate to its supply into the revivification equipment. The product recovery unit 7 employed is a conventionally known means, and will not, therefore, be described in further detail.

At regular intervals on the inner sidewall of the reactor column 5 are fixed baffles 12. As indicated in FIGS. 3 and 4 each baffle 12 extends around the inner periphery of the reactor column 5 and is inclined downwardly into the intermediate compartment C2. The angle of downward inclination of each baffle 12 is greater than the angle of repose of the activated carbon supplied via the chute 6, whereby the activated carbon may collide with the baffles 12, but may not be retained thereby. Behind the baffles 12 are ducts 14, as shown most clearly in FIG. 3. The ducts 14 permit passage of reactor gas, or vapour, between the outermost compartment C1 and the intermediate compartment C2, but the baffles 12 are inclined sufficiently, and are sufficiently long to prevent entrainment of activated carbon through the ducts 14.

In FIG. 1, the vertical pipe 8 is located centrally in the reactor column 5, the bottom end thereof is sealed, and the lower portion thereof extends below the level of the retort bottom wall 1C to the vicinity of the bottom of the reactor column 5. The top portion of the pipe 8 extends through and above the top of the reactor column 5. A supply line 11, which is openable or closeable by a valve 11a and is external with respect to the reactor column 5, communicates with the top portion of the pipe 8. The supply line 11 connects with a second reactor gas supply system II from which steam or other vapour may be force-fed into the central pipe 8. The top end of the pipe 8 is open and constitutes an exhaust outlet 10a, which communicates with an exhaust pipe 10b, and is closeable by a damper 9. Because the supply line 11 communicating with a point on the pipe 8 is below the exhaust outlet 10a, the supply of reactor gas from the second supply system II into the pipe 8 depends only on opening or closing of the valve 11a and is independent of the condition of the damper 9. The first and second supply systems I and II are of the conventional type. At regular intervals on the outer side of the central pipe 8 are fixed baffles 13. As shown in FIGS. 3 and 4 each baffle 13 surrounds the outer periphery of the central pipe 8 and is downwardly inclined towards the intermediate compartment C2 at an angle such that activated carbon supplied into the revivification equipment may collide therewith, but may not be retained thereby. The positions of the baffles 13 are staggered with respect to the baffles 12, that is, no baffle 13 lies in direct horizontal line with any baffle 12, as indicated in FIGS. 1 and 3. The intermediate compartment C2 is thus effectively divided into a series of alternate wider portions and narrower portions. Behind the baffles 13 are ducts 15 in the wall of the pipe 8, as indicated most clearly in FIG. 3. The ducts 15 permit passage of reactor gas, or vapour, between the intermediate compartment C2 and the innermost compartment C3. Like the baffles 12 of the reactor column 5, the baffles 13 of the central pipe 8 are of suitable length and inclination to prevent entrainment of activated carbon through the ducts 15. In FIG. 1, a supply line 16 fitted with a stop valve 16a, passes through the wall of the reactor column 5 and communicates with the lower portion of the central pipe 8. The supply line 16 and valve 16a are accommodated in the base hollow portion to permit easy manipulation of the valve 16a. The line 16 connects to a subsidiary air supply which is employed in a second embodiment of the invention in order to promote complete combustion of unrequired malodorous elements released from activated carbon during the revivification thereof.

A revivification apparatus constructed in accordance with the foregoing description operates as follows. In revivification of activated carbon both by the direct heating process and by the indirect heating process, activated carbon to be treated is fed via the supply chute 6 into the intermediate compartment C2, and all the burners 2a, 2b, 2' are actuated to supply heat to the outermost compartment C1.

During employment of the equipment for the direct heating process, the damper 3 associated with the exhaust outlet 4a of the retort 1 is positioned to close the exhaust outlet 4a, the damper 9 associated with the exhaust outlet 10a of the central pipe 8 is positioned to open the exhaust 10a; the supply line 11 connecting to the second reactor gas supply system II is closed by the valve 11a; and the force-fed steam for revivification of the activated carbon is supplied from the first reactor gas supply system I via the burner 2a, or the burner 2b, or both burners 2a, 2b, into the outermost compartment C1. The reactor gas, in this case steam, passes from the outermost compartment C1 through the ducts 14 of the reactor column 5 into the intermediate compartment C2, from the intermediate compartment C2 through the ducts 15 of the central pipe 8 into the innermost compartment C3, and then is exhausted from the innermost compartment C3 via the exhaust outlet 10a into the exhaust pipe 10b. During passage of the reactor gas across the intermediate compartment C2, activated carbon, which is moving downwards through the central compartment C2, comes into contact with the reactor gas and is revivified thereby. After treatment and after reaching the bottom of the central compartment C2, the activated carbon is removed in set quantities and at certain intervals by the product recovery unit 7 in a conventional manner.

During employment of the equipment for the indirect heating process, the settings of the dampers 3, 9 are reversed, and the reactor gas is supplied from the second supply system II instead of from the first supply system I. That is, the retort exhaust outlet 4a is opened, the exhaust outlet 10a of the central pipe 8 is closed, the supply line 11 is opened, and the burners 2a, 2b, 2' are employed simply to supply heat. No reactor gas for revivification purposes is supplied through either the burner 2a or the burner 2b. In this case, reactor gas is supplied from the second supply system II via the supply line 11 to the top of the pipe 8 and into the innermost compartment C3. The reactor gas passes from the innermost compartment C3 through the ducts 15 of the central pipe 8 into the intermediate compartment C2 where it contacts and treats the activated carbon which is moving downwards through the intermediate compartment C2. The reactor gas then passes from the intermediate compartment through the ducts 14 of the reactor column 5 into the outermost compartment C1, from which it is removed via the exhaust outlet 4a and exhaust pipe 4b. As in the direct heating process, treated carbon is removed at suitable intervals and in suitable quantities by the product recovery unit 7.

It is to be noted that in revivification of activated carbon with the equipment of the invention, in both the direct and indirect heating processes, activated carbon to be treated and supplied into the reactor column 5 via the chute 6 moves downwards through the intermediate compartment C2 in a generally zig-zag and rotatory fashion, due to impingement on alternate baffles 12, 13, and also, due to the fact that the intermediate compartment C2 is divided into a series of alternating constricted sections by the arrangement of the baffles 12, 13, and to the fact that entry of reactor gas, or vapour, into the intermediate compartment C2 is generally radial with respect to the longitudinal vertical axis of the reactor column 5, whereas the direction of movement of the activated carbon is more parallel to the longitudinal axis of the reactor column 5. Also, this difference between the angles of movement of the activated carbon to be treated and of the reactor gas, or vapour, ensures good mingling of the reactor gas, or vapour, with the activated carbon, whereby the revivification effects of the equipment are enhanced. Furthermore, it is to be noted that, since the baffles 12, 13 of the reactor column 5 and the central pipe 8 are staggered with respect to each other so as to make the reactor gas or vapour in the intermediate compartment C2 detour, the reactor gas or vapour is retained for a long time to contact with the activated carbon in the intermediate compartment C2, thereby enhancing its effectiveness for revivification of the activated carbon.

In a second embodiment of the invention subsidiary air is supplied to assist complete combustion of any malodorous elements released during treatment of activated carbon and, also any remnant combustible elements in the reactor gas employed for treatment of the carbon. One subsidiary air supply is connected to the central pipe 8 by a line 16, as described above. The other subsidiary air supply is connected to the retort 1 and is suitably in the form of a supply of air through the lower burner 2' in excess to the requirements of the burner 2'.

Results obtained with the abovedescribed revivification equipment are illustrated below in reference to examples of running-tests carried out thereon.

EXAMPLE 1

Revivification of activated carbon in the form of powder having a grain diameter of 10 – 32 mesh was carried out at the rate of 50 tons per month under the conditions indicated below; the carbon had been used in tertiary treatment of industrial sewage subsequent to treatment thereof with activated sludge.

| | |
|---|---|
| Heating method: | indirect heating |
| Reactor gas: | steam at 10 kg/hr. |
| Reactor column (5): | internal diameter 300 mm |
| Pipe (8): | internal diameter 100 mm |
| Baffles (12): | 10 tiers ⎫ |
| Baffles (13): | 10 tiers ⎬ total length 3 m |
| Ducts (14): | provided at 4 different locations behind each baffle 12 |
| Ducts (15): | provided at 4 different locations behind each baffle (13) |
| Retort internal temperature: | upper portion (T1) 850° C |
| | middle portion (T2) 850° C |
| | lower portion (T3) 800° C |

In this test, the recovery ratio of after treatment of activated carbon was 99 %. The properties of the recovered product are indicated in Table 1 below. For the purposes of comparison, Table 1 also lists properties possessed by the same activated carbon prior to use thereof.

Table 1

| | New Product | After Use | After Revivification |
|---|---|---|---|
| COD Substances | 10 % | 0 % | 9 % |
| Adsorption Capacity Iodine Adsorption Capacity | 1.2g/g | 0.6g/g | 1.2g/g |

EXAMPLE 2

Revivification of activated carbon which had been used in the treatment of industrial sewage in the same manner as that of Example 1 was carried out at the rate of 100 tons per month. Conditions of the test were the same as in Example 1, except that all temperatures T1, T2, and T3 were 800° C, oxygen content of the combustion gas was 0 %, vapour pressure was 20 %, and the direct heating method was employed. The recovery ratio in this case was 95 %, and the properties of the recovered product were as indicated in Table 2, which is in the same form as Table 1 above.

Table 2

|  | New Product | After Use | After Revivification |
|---|---|---|---|
| COD Substances Adsorption Capacity | 10 % | 0 % | 10 % |
| Iodine Adsorption Capacity | 1.2g/g | 0.6g/g | 1.1g/g |

As is clear from the above description, the present invention provides an activated carbon revivification apparatus which is simple in construction and operation, is of high efficiency, and permits revivification of activated carbon by the direct heating process or by the indirect heating process. The equipment of the invention thus lessens costs of plant installation, simplifies work procedures, and offers considerable advantages industrially.

What is claimed is:

1. An apparatus for revivification of activated carbon by direct and indirect heating comprising:
   a first cylindrical compartment having a vertical central axis;
   at least one heating means directed into said first compartment for heating said first compartment;
   a first reactor gas supply means directed into said first compartment for supplying reactor gas thereto during direct revivification of the activated carbon, said first reactor gas supply means stopping the supplying of reactor gas during indirect revivification of the activated carbon;
   a first gas exhaust means connected to said first compartment means for removing exhaust reactor gases and vapors therefrom;
   a first damper means provided into said first gas exhaust means for closing said first gas exhaust means during direct revivification of the activated carbon and opening said first gas exhaust means during indirect revivification of the activated carbon;
   a second cylindrical compartment concentrically within and extending through said first compartment;
   activated carbon supply means for supplying activated carbon to be revivified connected to the top of said second compartment;
   carbon removal means at the bottom of said second compartment for removing the revivified activated carbon therefrom;
   a third cylindrical compartment concentrically within said second compartment;
   guide means within said second compartment for guiding said activated carbon being revivified through said second compartment, said guide means comprised of a plurality of baffles staggered with respect to each other on the inside wall of said second compartment and the outside wall of said third compartment downwardly inclined at an angle to the central axis sufficient to prevent the activated carbon supplied to the second compartment from being retained thereby as it collides with said baffles while falling through said second compartment and positioned so that the carbon is directed essentially vertically through the second compartment;
   a second reactor gas supply means operatively connected to said third compartment for supplying reactor gas to said third compartment during indirect revivification of said activated carbon, said second reactor gas supply means stopping the supplying of reactor gas during direct revivification of the activated carbon;
   a second gas exhaust means connected to said third compartment for removing exhaust reactor gases and vapors therefrom;
   a second damper means within said second gas exhaust means for closing said second gas exhaust means during indirect revivification of the activated carbon and opening said second gas exhaust means during direct revivification of the activated carbon;
   a first gas communication means through the wall of said second compartment for communicating gas and vapor between said first compartment and said second compartment, said first gas communication means being comprised of a plurality of ducts through said second compartment wall;
   a second gas communication means within the wall of said third compartment for communicating gas and vapor between said third compartment and said second compartment, said second gas communication means being comprised of a plurality of ducts through said third compartment wall, whereby during direct revivification of said activated carbon, reactor gas from said first reactor gas supply means enters said first compartment, flows through said first gas communication means to said second compartment, wherein said reactor gas reacts with the activated carbon, and flows through said second gas communication means to said third compartment where it is removed therefrom through said second gas exhaust means, and whereby during said indirect revivification process said reactor gas from said second reactor gas supply means enters said third compartment, flows through said second gas communication means to said second compartment where it reacts with said activated carbon, and then flows through said first gas communication means to said first compartment where it is removed therefrom through said first gas exhaust means.

2. An apparatus as claimed in claim 1, wherein the inlet of at least one heating means is also the inlet of said first reactor gas supply means into said first cylindrical compartment.

3. An apparatus as claimed in claim 1, further comprising a first subsidiary air supply means connected to said first cylindrical compartment for supplying additional air for combustion within said first cylindrical compartment.

4. An apparatus as claimed in claim 1, further comprising a second subsidiary air supply means connected to said second cylindrical compartment for supplying additional air for combustion within said second cylindrical compartment.

* * * * *